Patented Jan. 19, 1937

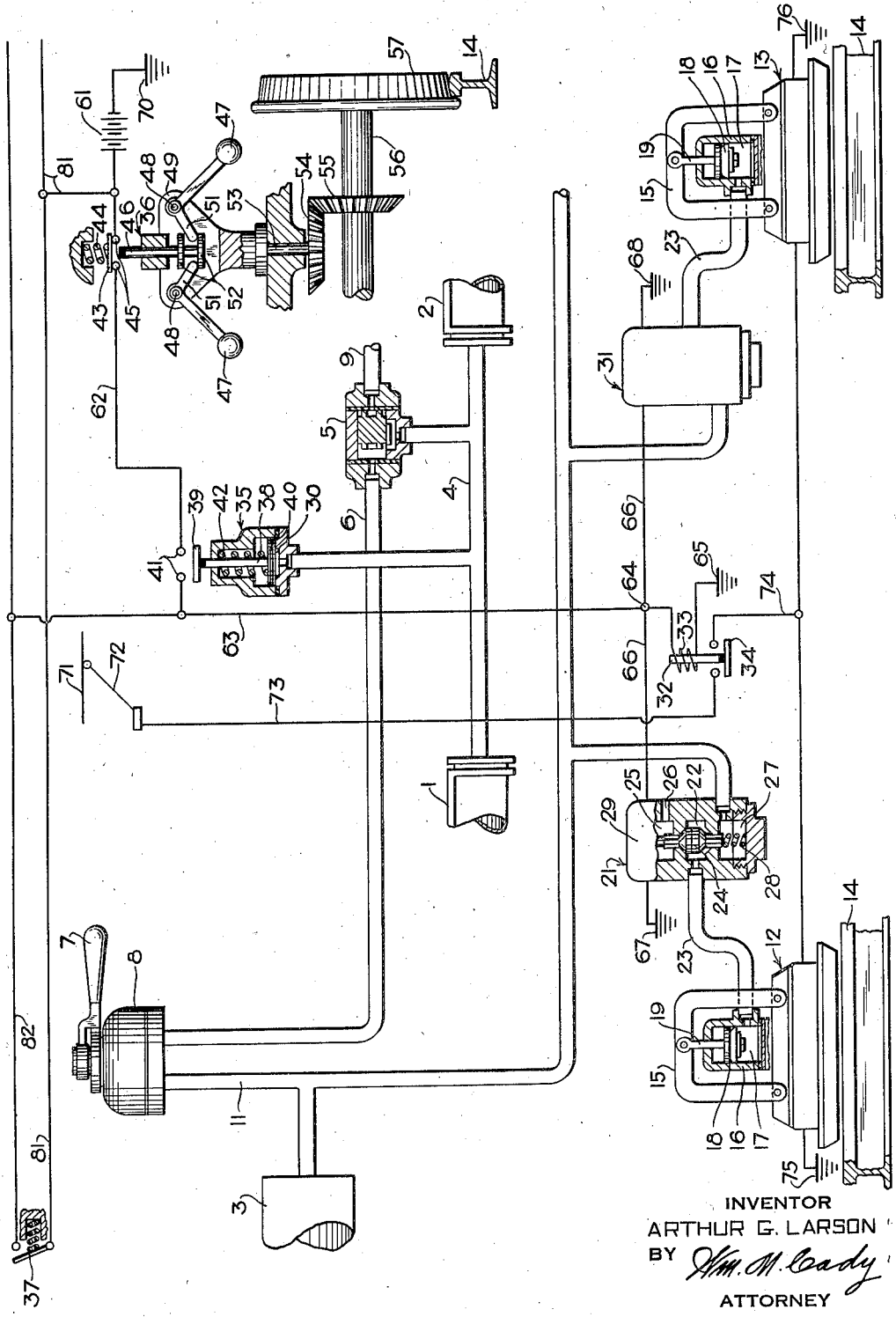

2,068,335

UNITED STATES PATENT OFFICE 2,068,335

MAGNETIC TRACK BRAKE

Arthur G. Larson, Forest Hills, Pa., assignor to The Westinghouse Air Brake Company, Wilmerding, Pa., a corporation of Pennsylvania Application December 18, 1935, Serial No. 55,055

10 Claims. (Cl. 303—3)

My invention relates to braking equipment for vehicles employing magnetic track brakes and particularly to the automatic control of the magnetic track brake.

It is an object of my invention to provide a brake equipment for vehicles employing fluid pressure braking means and magnetic track braking means together with means for automatically controlling the application and release of the magnetic braking means in accordance with the application and release of the fluid pressure braking means when the vehicle is above a predetermined speed, and to provide additional means for releasing the magnetic track brakes after application upon the deceleration of the vehicle to a predetermined speed independently of the release of the fluid pressure brake.

Other objects and advantages of my invention will be apparent from the following description of one preferred embodiment thereof, reference being had to the accompanying drawing.

In the accompanying drawing the single figure is a diagrammatic view of one preferred embodiment of the invention which provides fluid pressure braking means having brake cylinders 1 and 2 that may be supplied with fluid under pressure from the main reservoir 3 through brake cylinder pipe 4, the double check valve 5, and the straight air pipes 6 in accordance with the movement of a manually operable lever 7 of a brake valve device 8. A similar brake valve device may be provided at the other end of the vehicle for controlling the supply of fluid under pressure to the brake cylinders through the straight air pipe 9.

Electrically energized track braking means is also provided comprising the magnetic track shoes 12 and 13 that are adapted to engage the rail 14 and are mounted on a supporting bracket 15 by means of which the track shoe is raised from, or lowered into, engagement with the track rail 14. For controlling the raising and lowering of the track shoe a raising and lowering cylinder 16 is provided having a piston chamber 17 containing the piston 18 having a stem 19 that is connected at its upper end to the bracket 15, and that is movable together with the bracket 15 and track shoe 12. A track shoe raising and lowering magnet valve device 21 is provided for controlling the supply of fluid under pressure to the raising and lowering cylinder piston chamber 17 associated with the track shoe 12, and comprises a casing providing a valve chamber 22 that is in constant communication through pipe 23 with the piston chamber 17 and which contains a double beat valve 24 for controlling communication between the valve chamber 22 and the atmosphere through an exhaust chamber 25 and exhaust port 26 in the upper part of the casing, and for controlling communication from an inlet chamber 27 in the lower part of the casing that is in constant communication with a main reservoir pipe 11. A spring 28 is provided in the chamber 27 for normally forcing the double beat valve 24 against its upper seat, and a magnet 29 is provided in the upper part of the casing, which, when energized, forces the double beat valve 24 against the bias of the spring 28 to its lower seat.

The parts of the track shoes 13 and of the magnet valve device 31 correspond, respectively, and the magnet valve device 31 corresponding in structure and function to the like parts of the track shoe 12 and the magnet valve device 21.

The energization of the magnetic track shoes is controlled by a contactor 32, having a winding 33 and a contact member 34, and is controlled by a pressure operated switch 35 and a speed responsive switch device 36, or by a manually operable switch 37 in a manner to be later explained.

The pressure operated switch 35 comprises a casing providing a piston chamber 30 that is in constant communication with the brake cylinder pipe 4 and which contains a piston 40 having an upwardly extending stem 38 operatively connected to a movable switch contact member 39 that is adapted to engage the fixed switch contact member 41, and about which a spring 42 is provided for forcing the piston 37 and the switch contact member 39 downwardly to its open circuit position.

The speed responsive switch device 36 comprises a movable switch contact member 43 that is normally biased by a spring 44 into engagement with fixed contact members 45, and an operating rod or shaft 46 controlled by fly balls 47 that are mounted by pins 48 on a revolving head 49 and are provided with laterally extending arm portions 51 that are adapted to engage between collars 52 carried by the shaft 46. The head 49 and the fly balls 47 are driven in accordance with the speed of the vehicle wheel 57 by a shaft 53, through bevel gears 54 and 55 that are driven from the wheel axle 56.

When the vehicle is started from rest and reaches a predetermined speed the fly balls 47 will be forced outwardly from their axis of rotation, thus causing the arms 51 to be moved downwardly and move the shaft or rod 46 out of engagement with the contact member 43, as shown, thus permitting the spring 44 to force the contact member 43 into engagement with the fixed contact member 45 to maintain the switch in its circuit closing position.

If, while the vehicle is above the predetermined speed necessary to effect closing of the switch 36, the operator wishes to apply the brakes the handle 7 of the brake valve device 8 is moved to a position to effect the supply of fluid under pressure from the main reservoir 3 through main reservoir pipe 11, the brake valve device 8, straight air pipe 6, double check valve 5, and brake cylinder pipe 4 to the brake cylinders 1 and 2. As the pressure in the brake cylinder pipe 4 builds up the pressure in the piston chamber 30 of the pressure operating switch 35 correspondingly increases, causing the piston 40 and the switch contact member 39 to be forced upwardly against the bias of the spring 42 to bring the contact member 39 into engagement with the contact members 41, thus completing a circuit from the battery 61 through the switch contact members 43 and 45, conductor 62, the pressure operated switch contact members 39 and 41, conductor 63 to the junction point 64 where the circuits divide, one branch extending from the junction point 64 through the winding 33 of the contactor 32 to ground at 65 to the grounded terminal 70 of the battery 61, the other branches extending from the junction point 64 through conductor 66 and the windings of the magnets 29 of the magnet valve devices 21 and 31, respectively, to ground at 67 and 68, respectively, and to the battery terminal 70.

The energization of the contactor 32 causes the contact member 34 to be moved upwardly to a circuit closing position to close a circuit from the overhead trolley conductor 71 through trolley 72, conductor 73, contact member 34 of the contactor 32, conductor 74, and through the windings of the track shoes 12 and 13 to ground at 75 and 76, respectively, to energize the magnetic track shoes.

At the same time that the contactor 32 is energized the windings of the magnets 29 of the magnet valve devices 21 and 31 are energized, thus forcing the double beat valve 24 downwardly against the bias of the spring 28 to close communication from the main reservoir pipe 11 to the piston chamber 17 of the track shoe raising and lowering cylinder 16, and to open communication from the piston chamber 17 to the atmosphere through pipe 23, valve chamber 22, the exhaust chamber 25, and exhaust port 26, thus permitting the pistons 18 carrying the supporting brackets 15 and the track shoes 12 and 13 to be lowered into engagement with the rail 14.

Should the operator, at any car speed, move the handle 7 to release the fluid pressure brakes by releasing fluid under pressure from the brake cylinders 1 and 2, the pressure operated switch 35 would move to its illustrated position to interrupt the circuit through the contact members 39 and 41, thus permitting the contactor 32 to drop to its lower or illustrated position to interrupt the circuit through the windings of the track shoes 12 and 13, and to also interrupt the energization of the magnets 29 of the track raising and lowering magnet valve devices 31 and 32. Upon the deenergization of the magnet 29, the double beat valve 24 is forced upwardly by the spring 28 to its upper seated, or illustrated, position thus closing communication from the piston chamber 17 of the track brake raising and lowering cylinder 18 to the atmosphere, through the exhaust chamber 25 and exhaust port 26, and opening communication from the main reservoir pipe 11 to the piston chamber 17 through inlet chamber 27, valve chamber 22, and pipe 23, to force the piston 18 upwardly to raise the bracket 15 and the track shoes 12 and 13 from engagement with the track rail 14.

If the operator leaves the fluid pressure brakes applied until the vehicle is brought to rest, the magnetic track brake, after being applied, will remain applied until the speed of the vehicle has decreased to some predetermined value such that the fly balls 47 will drop inwardly toward the axis of revolution sufficiently that the arms 51 will move upwardly to raise the rod 46 sufficiently to cause the contact member 43 to be forced upwardly from engagement with the contact members 45 against the bias of the spring 44, to thus interrupt the circuit through the contact members 43 and 45 and deenergize the winding 33 of the contactor 32 and the windings of the magnets 29 of the magnet valve devices 21 and 31 to effect the release of the magnetic track shoe brake in the manner above described.

The manually operable switch 37 is provided to effect the application of the track shoe brake independently of the application of the fluid pressure brakes and of the brake valve handle 7, by closing a circuit from the positive terminal of the battery 61 through conductor 81 and switch 37, conductor 82, conductor 63, to the junction point 64 and to ground at 65, 67, and 68 in the manner above described to effect application of the magnetic track brakes.

It will be observed that I have provided a combined pneumatic and magnetic track brake equipment for vehicles of such character that, when the vehicle speed is above a predetermined value and the centrifugal switch is closed, the magnetic track brakes are under the control of the fluid pressure brakes, and, that as soon as a minimum brake cylinder pressure is developed the pressure operated switch 35 effects application of the magnetic track brake, and that the magnetic track brake may be released either upon a reduction in brake cylinder pressure or upon a decrease in vehicle speed to such a predetermined value as to open the centrifugal switch. It will also be noted that the magnetic track brakes may be applied manually independently of the operation of the fluid pressure brakes.

While I have illustrated and described one preferred embodiment of my invention, it will be obvious to those skilled in the art that many modifications may be made in the circuits and apparatus illustrated without departing from the spirit of my invention, and I do not wish to be limited otherwise than by the scope of the appended claims.

Having now described my invention, what I claim as new and desire to secure by Letters Patent, is:

1. In a brake equipment for vehicles, in combination, a brake cylinder, means for supplying fluid under pressure to said brake cylinder to effect a fluid pressure application of the brakes, magnetic track shoe braking means, electrically controlled means for lowering said track shoe braking means into engagement with the track rails, electrically controlled means for controlling the energization of said track shoe braking means, means responsive to the supply of fluid under pressure to said brake cylinder for effecting the energization of said electrically controlled means to cause the application of said magnetic track shoe braking means, and means responsive to vehicle speed for effecting the deenergization of said electrically controlled means to cause the release of said magnetic track shoe brake prior to the complete stopping of the vehicle.

2. In a brake equipment for vehicles, fluid pressure braking means, magnetic track shoe braking means, manually operable means for controlling the supply of fluid under pressure to effect fluid pressure application of the brakes, means responsive to the supply of fluid under pressure to effect a fluid pressure application of the brakes for completing a circuit for effecting application of the magnetic track shoe braking means, and means responsive to a deceleration of the vehicle to a predetermined speed for interrupting said circuit to effect the release of said magnetic track shoe braking means.

3. In a brake equipment for vehicles, in combination, a brake cylinder and means for supplying fluid under pressure to said brake cylinder to effect an application of the brakes, a magnetic track shoe braking means, and electrical control means including an electric circuit and a pressure operated switch responsive to brake cylinder pressure for closing said circuit to effect application of said magnetic track shoe braking means, and means responsive to vehicle speed for interrupting said circuit to release said magnetic track shoe braking means prior to the complete stopping of the vehicle.

4. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising an electrically controlled means for lowering the track shoe into engagement with the track rails and electrically controlled means for energizing said track shoe, and means for controlling said electrically controlled means comprising a pressure operated switch responsive to brake cylinder pressure and a switch responsive to vehicle speed.

5. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising an electric control circuit, a pressure switch and a centrifugal switch connected in series in said control circuit, means responsive to brake cylinder pressure for closing said pressure switch, and means responsive to a predetermined vehicle speed for closing said centrifugal switch.

6. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising a pressure operated switch responsive to brake cylinder pressure for effecting application of the magnetic track shoe braking means when the vehicle speed is above a predetermined value and a speed responsive switch responsive to vehicle speed.

7. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising a magnet valve device for controlling the lowering of said track shoe into engagement with the track rail, an electric contactor for controlling the energization of said track shoe, means for controlling the energization of said magnet valve device and of said contactor comprising a pressure operated switch responsive to brake cylinder pressure and operable to effect the energization of said magnet valve device and said contactor upon the supply of fluid under pressure to said brake cylinder, and a speed responsive switch in series circuit relation with said pressure operated switch and operable to a circuit closing position upon a predetermined vehicle speed.

8. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising a magnet valve device for controlling the lowering of said track shoe into engagement with the track rail, an electric contactor for controlling the energization of said track shoe, means for controlling the energization of said magnet valve device and of said contactor comprising a pressure operated switch responsive to brake cylinder pressure and operable to a circuit closing position to effect the energization of said magnet valve device and of said contactors upon the supply of fluid under pressure to said brake cylinder, and a speed responsive switch in series circuit relation with said pressure operated switch and operable to a circuit closing position upon a predetermined vehicle speed, and means operable manually for energizing said magnet valve device and said electric contactor independently of the operation of said pressure operating switch and of said speed responsive switch.

9. In a brake equipment for vehicles, in combination, a brake cylinder, magnetic track shoe braking means, manually operable means for controlling the supply of fluid under pressure to the brake cylinder to effect a fluid pressure application of the brakes, means for controlling the application and release of said magnetic track shoe braking means comprising means responsive to brake cylinder pressure for effecting application of the track shoe braking means when the vehicle speed is above a predetermined value, and manually operable means for effecting the application of said track shoe braking means independently of the supply of fluid to said brake cylinder.

10. In a brake equipment for vehicles, fluid pressure braking means, magnetic track shoe braking means, manually operable means for controlling the supply of fluid under pressure to effect fluid application of the brakes, means responsive to the supply of fluid under pressure to effect a fluid pressure application of the brakes for completing a circuit for effecting application of the magnetic track shoe braking means, means responsive to the deceleration of the vehicle to a predetermined speed for interrupting said circuit to effect the release of said magnetic track shoe braking means prior to the complete stopping of the vehicle, and manually operable means for effecting the application of the track shoe braking means independently of the application of said fluid pressure braking means.

ARTHUR G. LARSON.